UNITED STATES PATENT OFFICE.

ALBERT HERRMANN, OF HÖCHST-ON-THE-MAIN, GERMANY, ASSIGNOR TO THE FARBWERKE, VORMALS MEISTER, LUCIUS & BRÜNING, OF SAME PLACE.

GREEN ACID DYE.

SPECIFICATION forming part of Letters Patent No. 628,243, dated July 4, 1899.

Application filed October 26, 1898. Serial No. 694,584. (Specimens.)

*To all whom it may concern:*

Be it known that I, ALBERT HERRMANN, doctor of philosophy, a citizen of the Empire of Germany, residing at Höchst-on-the-Main, Germany, have invented a new and useful Improvement in the Manufacture of Acid Dyestuffs of the Diphenylnaphthylmethane Series, of which the following is a specification.

I have found that from polysulfonic acids of tetralkyldiamido diphenylnaphthylmethanes may be obtained valuable green acid dyestuffs, which well exhaust the dye fluid. They dye evenly and behave favorably under the action of light and soap.

I produce these dyestuffs by treating the tetralkyldiamido diphenylnaphthylmethanes or their monosulfonic acids with energetically-acting sulfonating agents and by oxidizing the leucosulfonic acids thus obtained.

The production of the leuco compound and its polysulfonic acid from naphthalene and tetralkyldiamido benzhydrol may also be carried out in a single operation.

Example: 12.8 kilograms of naphthalene are well mixed with twenty-seven kilograms of tetramethyldiamido benzhydrol and then slowly run into two hundred kilograms of fuming sulfuric acid of twenty per cent. $SO_3$, while cooling with ice-water. The solution thus obtained is allowed to stand for some time at ordinary temperature or is heated for several hours to from 50° to 60° centigrade till a sample of it readily dissolves in water and dilute ammonia. The product of reaction is poured into water and transformed in the usual manner into the calcium salt.

If one starts from tetramethyldiamido diphenylnaphtylmethane alpha- or beta-monosulfonic acid, the sodium salt of the respective sulfonic acid is dissolved in five times the quantity of fuming sulfuric acid of twenty per cent. $SO_3$, and the remaining steps may be carried out in the same manner. The leuco salt thus obtained is oxidized with the calculated quantity of peroxid of lead and sulfuric acid into dyestuff. Five kilos of this salt, for instance, are dissolved in fifty liters of water, to which is added the calculated quantity of dilute sulfuric acid, and the whole is poured while well stirring into 2.04 kilograms of peroxid of lead mixed with water, whereupon it is filtered and the dye solution evaporated to dryness.

The new dyestuff forms a copper-colored powder, readily soluble in water with a green color. A solution of common salt does not precipitate the dyestuff. It dyes wool and silk in an acid-bath an even green, the tints being fast to washing and light.

Instead of tetramethyldiamidobenzhydrol tetraethyldiamidobenzhydrol and other alkylated diamidobenzhydrols may be employed.

Having now described my invention, what I claim is—

1. The process of manufacturing green acid dyestuffs of the diphenylnaphthylmethane series, which consists in treating the monosulfonic acids of tetralkyldiamidodiphenylnaphthylmethanes with fuming sulfuric acid and in oxidizing the leucopolysulfonic acids to dyestuffs, substantially as set forth.

2. As new products the dyestuffs obtained by the action of fuming sulfuric acid upon tetralkyldiamidodiphenylnaphthylmethanes or their monosulfonic acids and by then oxidizing the leucopolysulfonic acids, forming a copper-colored powder, soluble in alcohol with difficulty, easily soluble in water with a green color, which on addition of a solution of common salt is not precipitated, dyeing wool and silk in an acid-bath an even green, their tints being fast to washing and light.

In testimony that I claim the foregoing as my invention I have signed my name in presence of two subscribing witnesses.

ALBERT HERRMANN.

Witnesses:
HEINRICH HAHN,
ALFRED BRISBOIS.